United States Patent
Pandey et al.

(10) Patent No.: US 8,135,568 B2
(45) Date of Patent: Mar. 13, 2012

(54) TURBOMACHINE AIRFOIL LIFE MANAGEMENT SYSTEM AND METHOD

(75) Inventors: Achalesh Kumar Pandey, Greenville, SC (US); Yoon Seok Choi, Greenville, SC (US); Scott Mordin Hoyte, Fountain Inn, SC (US); Wei Ning, Greenville, SC (US); Jagmeet Singh, Greenville, SC (US)

(73) Assignee: General Electric Company, Schenectady, NY (US)

( * ) Notice: Subject to any disclaimer, the term of this patent is extended or adjusted under 35 U.S.C. 154(b) by 32 days.

(21) Appl. No.: 12/823,619

(22) Filed: Jun. 25, 2010

(65) Prior Publication Data

US 2011/0320181 A1    Dec. 29, 2011

(51) Int. Cl.
G06G 7/48 (2006.01)

(52) U.S. Cl. .................... 703/7; 703/2; 701/100

(58) Field of Classification Search .................. 703/2, 7
See application file for complete search history.

(56) References Cited

U.S. PATENT DOCUMENTS

| | | | | |
|---|---|---|---|---|
| 4,422,333 | A * | 12/1983 | Leon | 73/660 |
| 6,438,484 | B1 | 8/2002 | Andrew et al. | |
| 6,755,617 | B2 * | 6/2004 | Escuret et al. | 700/170 |
| 7,065,471 | B2 * | 6/2006 | Gotoh et al. | 702/183 |
| 7,765,873 | B2 * | 8/2010 | Klosinski | 73/714 |
| 7,840,376 | B2 * | 11/2010 | Torng | 702/177 |
| 2002/0177979 | A1 * | 11/2002 | Andrew et al. | 702/188 |
| 2007/0088584 | A1 | 4/2007 | Aragones et al. | |
| 2007/0271023 | A1 * | 11/2007 | Morris et al. | 701/100 |
| 2008/0095612 | A1 | 4/2008 | Girbig et al. | |
| 2009/0301055 | A1 * | 12/2009 | Kallappa | 60/39.091 |

FOREIGN PATENT DOCUMENTS

| | | |
|---|---|---|
| EP | 1857637 A2 | 11/2007 |
| JP | 2000257449 A | 9/2000 |
| JP | 20010329856 A | 11/2001 |
| WO | 2009053183 A2 | 4/2009 |

OTHER PUBLICATIONS

Roemer et al, "Advanced Diagnostics and Prognostics for Gas Turbine Engine Risk Assessment", Aerospace Conference Proceedings, 2000 IEEE, pp. 345-353, vol. 6, Mar. 18-25, 2000.*
Suarez et al, "Jet Engine Life Prediction Systems Integrated with Prognostics Health Management", 2004 IEEE Aerospace Conference Proceedings, 2004.*
Haldeman et al, "Experimental Investigation of Vane Clocking in a Tone and One-Half Stage High Pressure Turbine", Transactions of the ASME, vol. 127, Jul. 2005.*
Hassan, Mohammed, "Vibratory Analysis of Turbomachinery Blades", Rensselaer Polytechnic Institute, Dec. 2008.*

* cited by examiner

*Primary Examiner* — Mary C Jacob
(74) *Attorney, Agent, or Firm* — Cantor Colburn LLP

(57) ABSTRACT

A system for creating a risk analysis for at least one turbomachine includes a database storing characteristics of one or more turbomachines and a processing module coupled to the database that receives the characteristics from the database and creates the risk analysis. The processing module includes a modeling module that creates a representation of the amount of rocking in a particular turbomachine based on the characteristics and a performance modeler coupled to the modeling module and that, based on the representation of the amount of rocking, creates the risk analysis.

14 Claims, 4 Drawing Sheets

TURBOMACHINE AIRFOIL LIFE MANAGEMENT SYSTEM AND METHOD

BACKGROUND OF THE INVENTION

The subject matter disclosed herein relates to turbines and, in particular, to management of compressor and turbine airfoil lifetimes.

A gas turbine engine typically includes a compressor, a combustor, and a turbine. The compressor and turbine generally include rows of airfoils or blades that are axially stacked in stages. Each stage generally includes a row of circumferentially spaced stator vanes, which are fixed, and a set of circumferentially spaced rotor blades, that rotate about a central axis or shaft. Generally, in operation, the rotor blades in the compressor rotor rotate about the shaft to compress a flow of air. The supply of compressed air is used in the combustor to combust a supply of fuel. The resulting flow of hot gases from the combustion is expanded through the turbine, which causes the turbine rotor blades to rotate about the shaft. In this manner, the energy contained in the fuel is converted into the mechanical energy of the rotating blades, which may be used to rotate the rotor blades of the compressor and the coils of a generator to generate electricity. During operation, because of the extreme temperatures, the velocity of the working fluid, and the rotational velocity of the rotor blades, the stator vanes and the rotor blades, through both the compressor and the turbine, are highly stressed parts.

Often, in both the compressor and the turbine sections of the turbine engine, rows of stator vanes of nearby or neighboring stages are configured with substantially the same number of circumferentially spaced vanes. In an effort to improve the aero-efficiency of turbine engines, efforts have been made to index or "clock" the relative circumferential positions of the airfoils in one row to the circumferential position of the airfoils in nearby or neighboring rows. However, while only minimally or negligibly improving engine aero-efficiency, it has been discovered that such conventional clocking methods generally function to increase the mechanical stresses acting on airfoils during operation. Of course, increased operational stresses can cause airfoils rocking and, ultimately, failures, which may result in extensive damage to the gas turbine engine.

High availability and reliability of power generation systems has been a major requisite of the electric utility industry for many years. The high cost of unreliability and forced outages is well known. Improper maintenance or operational anomoly detection may lead to turbine-forced outages. Early detection of such anomolies is important in preventing and reducing lengthy turbine forced outages.

A typical inspection may require that a turbine be shut down during the inspection. In such a case, at least a portion of a power generation plant's production capability may be hampered. Reducing the ability to generate power may have real economic costs associated with it. In addition, the inspection itself costs money. For at least these two reasons, it may be beneficial to perform inspections only when needed.

BRIEF DESCRIPTION OF THE INVENTION

According to one aspect of the invention, a system for creating a risk analysis for at least one turbomachine is disclosed. The system includes a database storing characteristics of one or more turbomachines and a processing module coupled to the database that receives the characteristics from the database and creates the risk analysis. The processing module includes a modeling module that creates a representation of the amount of airfoil rocking in a particular turbomachine based on the characteristics and a performance modeler coupled to the modeling module and that, based on the representation of the amount of rocking, creates the risk analysis.

According to another aspect of the invention, a computer implemented method of creating an inspection recommendation for a turbomachine is disclosed. The method includes: receiving at a computer operational data related to the turbomachine, the operational data including dynamic pressure indications from a region near at least one airfoil; creating a failure model from a first risk model based on the dynamic pressure indications; and creating an inspection recommendation based on the failure model.

According to another aspect of the invention, a computer implemented method of creating an inspection recommendation for a turbomachine is disclosed. The method includes: receiving at a computer operational data related to the turbomachine, the operational data including information related to clocking of airfoils in the turbomachine; creating a failure model from a risk model based on the clocking information; and creating an inspection recommendation based on the failure model.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As discussed above, compressor and turbine airfoils are subjected to several aero/acoustic excitations. These excitations may create wear on the root of the airfoil. Worn airfoils have an increased tendency to rock. If timely inspections and repairs are not done then this rocking may cause liberation of airfoils while the turbine is running. Liberated airfoil can cause collateral damage to the compressor and turbine.

Embodiments disclosed herein have the technical effect of providing accurate determinations of when inspections may be needed and the creation of a risk analysis. In one embodiment, the inspection determination or risk analysis is based on the amount of rocking, either measured or estimated based on the clocking of the airfoils. Heretofore, rocking has not been used as a component of product life cycle estimation or in repair/inspection recommendation metrics.

In particular, embodiments disclosed herein may allow for the provision of life assessment, asset planning and/or inspection recommendations using field data, operational profile, site conditions, hardware configuration, inlet conditioning, sensor information, reliability models, expert rules, classifiers and multivariate statistical techniques. The teachings herein, thus, allow for more accurately planning when to inspect the units, how to plan the assets and increasing the availability of the units in the fleet.

It shall be understood that while the following description described turbines, the teachings herein may apply to any turbomachine.

Figure 1:
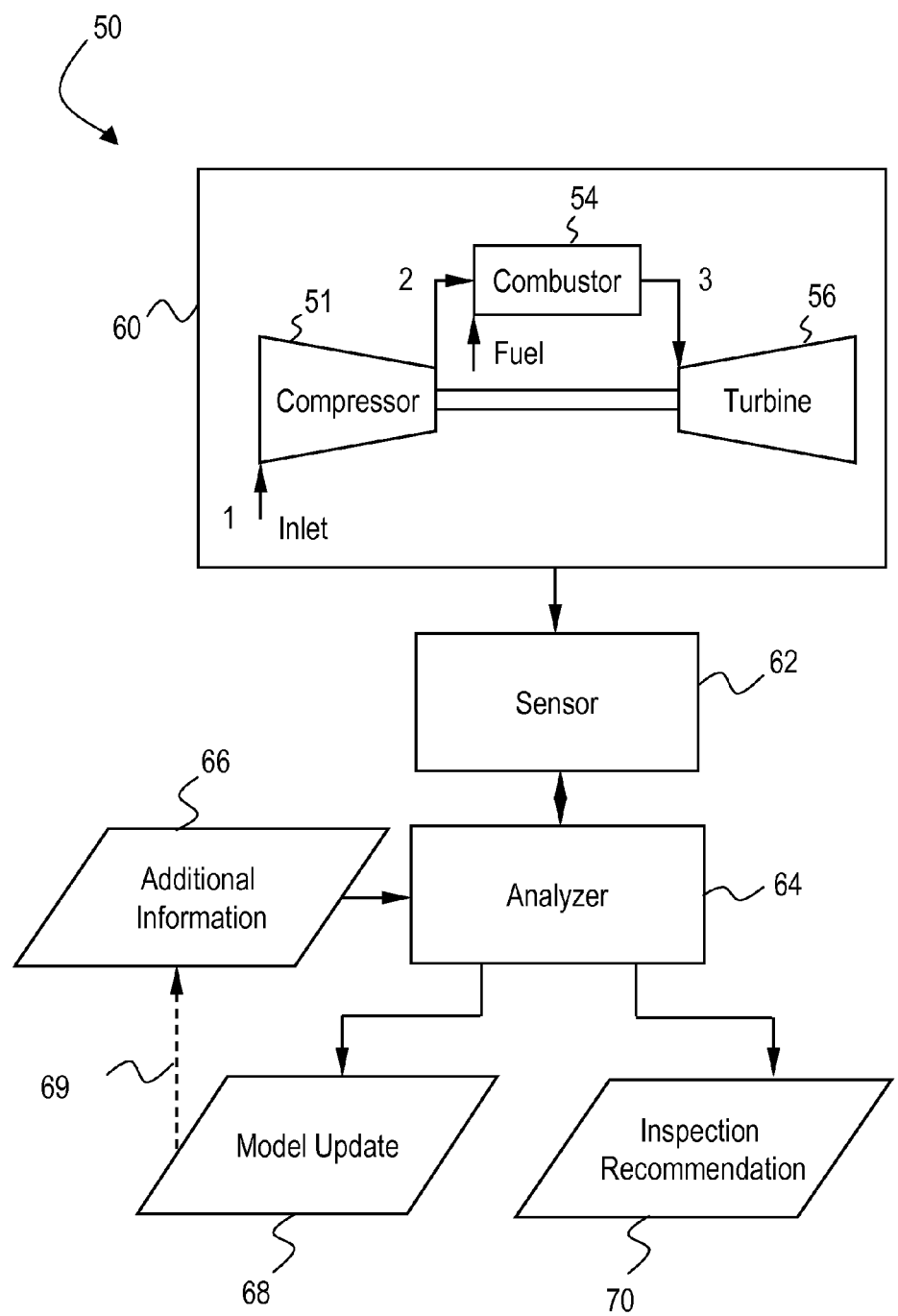
FIG. 1 is dataflow diagram showing a system according to an embodiment of the present invention.

FIG. 1 shows a dataflow diagram of a system 50 according to one embodiment. The system 50 may include one or more turbine systems 60. The turbine system 60 may include any type of turbine. In one embodiment, the turbine may be a gas turbine.

In the event the turbine system 60 comprises a gas turbine system, the turbine system 60 may include a compressor 51 to draw in and compress air; a combustor 54 (or burner) to add fuel to heat the compressed air; and a turbine 56 to extract power from the hot air flow. In one embodiment, the gas turbine is an internal combustion (IC) engine employing a continuous combustion process.

The system 50 may also include a sensor 62 coupled to the turbine system 60. The sensor 62 receives information from the turbine system 60 and, based on that information, the system 50 may determine a heat rate of the turbine 60. In one embodiment, the sensor 62 may receive dynamic pressure readings related to airfoils in the stator of the compressor 51 and turbine 56. Of course, such values are not required.

The sensor 62 is coupled to a performance analyzer 64. In one embodiment, the analyzer 64 receives information from the sensor 62 and additional information 66 from additional information sources (not shown) to produce one or both of a model update 68 or an inspection recommendation 70. In one embodiment, the inspection recommendation 70 is based on information related to airfoil clocking.

The recommendation 70 may be based, at least in part, on dynamic pressure readings via sensor 62 or from information about the turbine 60 under consideration. In more detail, the analyzer 64 may process information from dynamic pressure sensors and provide unsteady pressure amplitude and frequency information at various stages of the compressor 51. These dynamic sensors can be placed at various compressor and turbine stages to measure unsteady pressure. The unsteady pressure may be an indication of airfoil rocking. If dynamic sensors are not available, then an analytical model may be used by the analyzer to calculate projected airfoil rocking using compressor clocking information and other turbine parameters such as load, ambient temperature, etc.

The dynamic pressure sensor information or the projected rocking, along with other operational characteristics, parameters and ambient conditions, may be used to quantify airfoil wear as well as airfoil failure risk and classification probability values that may be contained in inspection recommendation 70.

The additional information 66 may include, but is not limited to, historical performance data for one or more turbine systems 60. In addition, the additional information may include various risk and classification models for different types of turbines. To that end, in one embodiment, the model update 68 may be integrated into the additional information 66 to provide more accurate models as indicated by dotted line 69.

The performance analyzer 64 may be implemented in hardware, software, or some combination thereof (firmware). The analyzer 64 receives the information from the sensor 62 and the additional information 66. As intermediary steps, the analyzer 64 may produce filtered data based on historical performance, validated data, and a temperature calculation.

Figure 2:
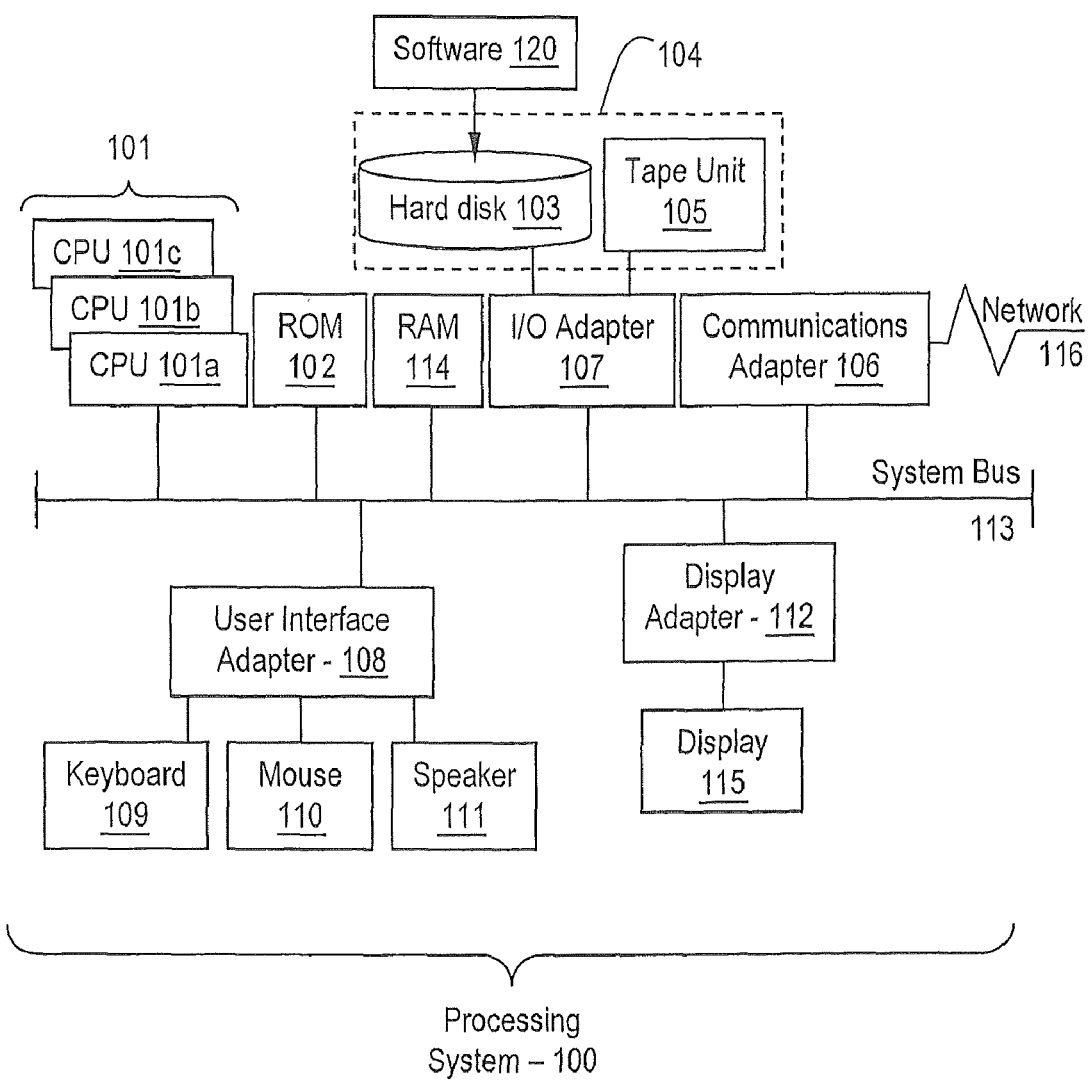
FIG. 2 shows a computing system on which embodiments of the present invention may be implanted.

Referring to FIG. 2, there is shown an embodiment of a processing system 100 for implementing the teachings herein. The processing system 100 may include the analyzer 64 (FIG. 1). In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 2 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling processing system 100 to communicate with other such systems. A display (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 can all be interconnected to bus 113 via user interface adapter 108, which may include, for example, a Super I/O chip integrating multiple device adapters into a single integrated circuit.

Thus, as configured in FIG. 2, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system to coordinate the functions of the various components shown in FIG. 2.

It will be appreciated that the system 100 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

The system 100 may operate on any known or later developed operating system. The system 100 also includes a network interface 106 for communicating over a network 116. The network 116 can be a local-area network (LAN), a metro-area network (MAN), or wide-area network (WAN), such as the Internet or World Wide Web.

Users of the system 100 can connect to the network through any suitable network interface 116, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 may include machine-readable instructions stored on machine readable media (for example, the hard disk 104) to execute one or more methods disclosed herein. As discussed herein, the instructions may be referred to as "software" 120. The software 120 may be produced using software development tools as are known in the art. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

Figure 3:
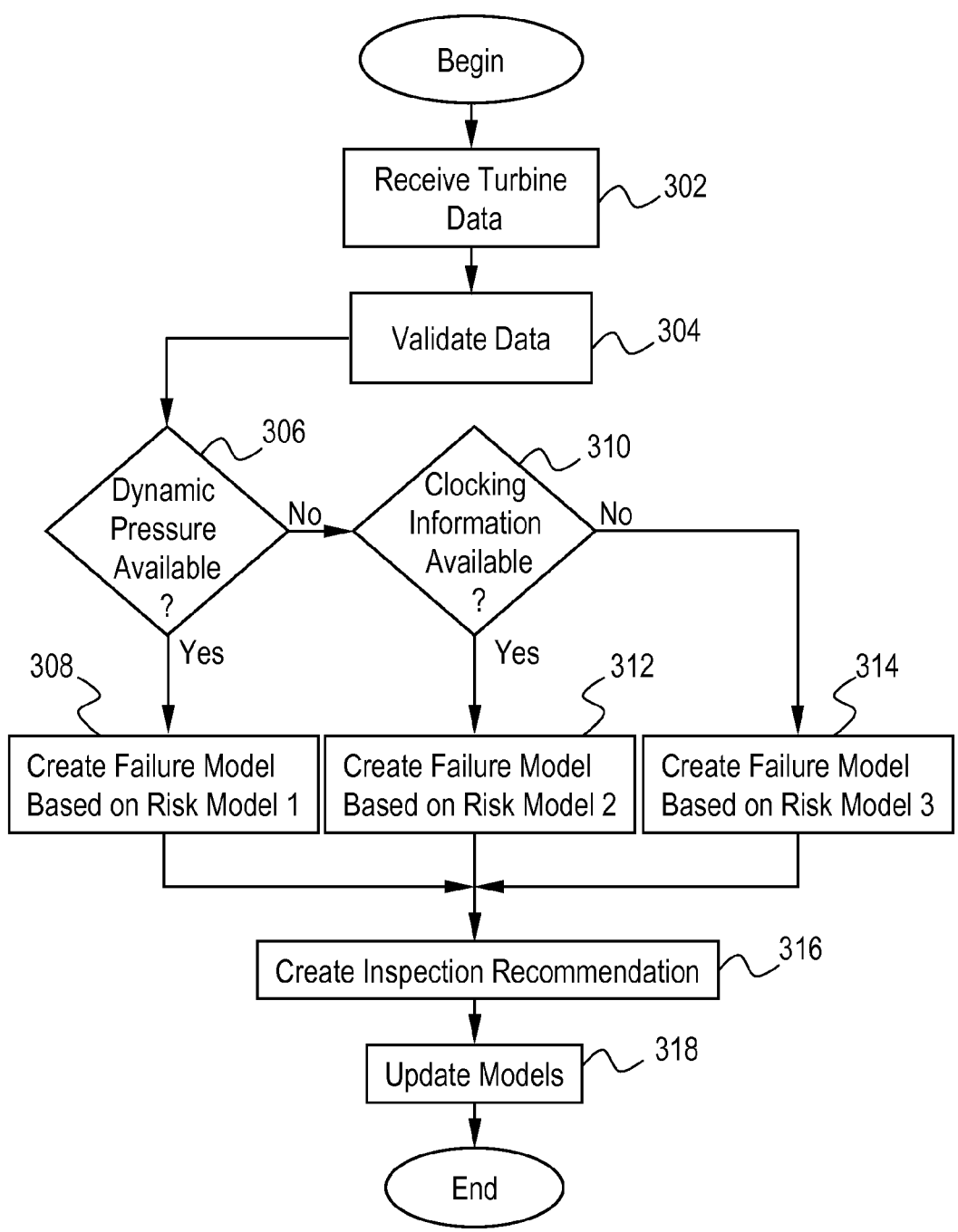
FIG. 3 shows a method according to an embodiment of the present invention.

FIG. 3 shows a flow diagram of a method according to one embodiment. The method begins at a block 302 where historical data about one or more turbines is received. This data may include, for example, general performance data. In one embodiment, the general performance data may be stored in 5-minute time intervals and include 132 tags (including raw and calculated data). This data may be received from, for example, a sensor or a database that stores data received from a sensor or other sources. In one embodiment, the sensor senses and provides dynamic pressure measurements from various locations near airfoils. Such pressure measurements may show that one or more airfoils is, or is beginning to, rock.

The method may include an optional data validation block 304. Data validation may include determining that the data received is for a continuous time period. Of course, other data validation may be performed as well based on the circumstances.

At a block 306, it is determined in dynamic pressure information is available. As discussed above, a turbine may include dynamic sensors located at various compressor and turbine stages to measure unsteady pressure. The unsteady pressure may be an indication of airfoil rocking. In the event that dynamic pressure information is available, at a block 308 an airfoil failure model is created on a first risk model that takes into account the dynamic pressure information.

In the event that the dynamic pressure information is not available, at a block 310, it is determined if clocking information about the turbine is available. It has been discovered that there is a relationship between clocking and rocking. In particular, it has been discovered that rocking is more likely in turbines having high or low clocking between airfoils. Accordingly, if clocking information is available, then, at a block 312, a failure model is created based on a second risk model that takes into account clocking in failure risk determinations.

In the event that clocking information is not available, at a block 314, a third risk model that does not consider clocking may be utilized to create a failure model.

Regardless of how created, the failure model may be utilized, at block 316, to create an inspection recommendation. At a block 318 the risk models may be updated based on the data used to create the failure model.

Figure 4:
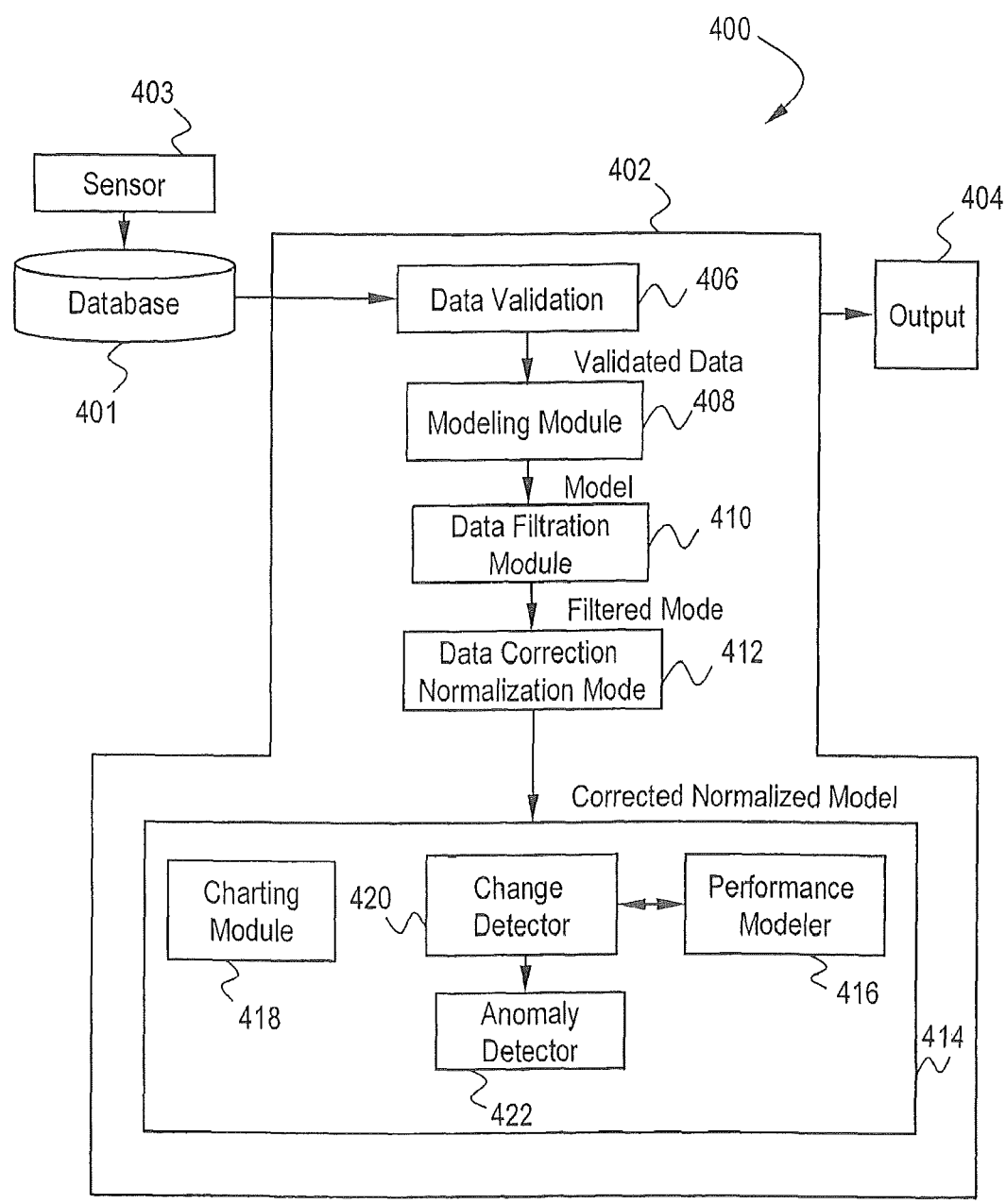
FIG. 4 is more detailed dataflow diagram for the system shown in FIG. 1.

FIG. 4 shows a system 400 on which some or all of the method described in FIG. 3 may be implemented.

The system 400 may include a database 401 and a processing module 402. The processing module 402 receives data from the database 401 and creates an output 404. The data from the database 402 may be, for example, data received from one or more sensors 403 coupled to gas turbines. This data may include any type of data that may be observed during the operation of a turbine including, but not limited to, an amount of input fuel, output power, temperature, cycle information, repair or inspection information, site atmospheric conditions, dynamic pressure data or any other information.

The output 404 could be any type of output. In one embodiment, the output 404 may be a report, a recommendation or a dashboard entry. Of course, the output 404 could be any type of output and could be provided to a user or to another processing device. In addition, the output 404 may be stored in the database 401 in some cases.

The data received from the database 401 may, optionally, be validated by data validator 406. Data validation may include determining that the data received is for a continuous time period. Of course, other data validation may be performed as well based on the circumstances.

Validated (or un-validated) data is passed to a modeling module 408. The modeling module 408 may perform one or more calculations to create a model of the operation of the turbine. In one embodiment, the modeling module may create a representation of the amount of rocking in a particular turbine over time. In one embodiment, the model may be represented as a graph. It shall be understood that data from multiple turbines may be modeled together in one embodiment to create a model for a particular class or type of turbine.

The system 400 may also include a data filtration module 410 coupled to the modeling module 408. The data filtration module 410 reduces variation in the model (the model being created from several runs or turbines) that it received from the modeling module 408. The data filtration module 410 may apply an expert rule, a median filter, a non-linear square filter, an exponential smoothing filter or other filter. Regardless of the filter applied, the data filtration module 410 creates a filtered time series for one or more turbine parameters. For example, the filtration module 410 may create a filtered time series representation of rocking for a particular turbine or class of turbines.

The system 400 may also include a data correction and normalization module 412 coupled to the data filtration module 410. Corrections and normalizations will be referred to herein collectively as normalization and shall refer to applying factors so that turbines regardless of size or location may be modeled on the same relative scale.

The system 400 may also include a post processing module 414. The post processing module 414 receives the normalized data from the data correction and normalization module 412 and creates the output 404. The post-processing module 414 may include one or more sub-modules. Some or all of these modules may work together in one embodiment depending on configuration.

In one embodiment, the post-processing module 414 includes a risk modeler 416. In a particular embodiment described below, the risk modeler is an airfoil failure prediction modeler. In general, the performance modeler 416 creates a predictive model based on the received model that may predict risk of failure due to airfoil rocking.

It shall be understood that while the model created by the performance modeler 416 may at times become incorrect as the turbine ages or degradation profile changes. The post-processing module 414 may include a charting module 418 that may show one or more performance models on the same display. This may give visual evidence that the performance has changed.

In addition, the post-processing module 414 may also include a change detector 420. The change detector 420 may apply change detection algorithms to detect statistically significant change in operational and performance parameters. These changes may be due to real operational issues such as water wash, hardware failure, maintenance, sensor calibration issues, software configuration issues, data quality issues, cycle deck configuration issues (wrong control curve, wrong cycle deck model, etc.), or pressure variations due to rocking.

In one embodiment, the change detector 420 may determine that a change has occurred and cause an anomaly detector 422 to analyze the model and the change. In one embodiment, based on the change and the model, the anomaly detector may create an output of one or possible causes of a problem or a proactive recommendation. To that end, the anomaly detector 422 may apply expert rules, fuzzy reasoning, feature extraction, artificial intelligence methods, empirical methods or other computer reasoning techniques.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for creating a risk analysis for at least one turbomachine, the system comprising:
   a database storing characteristics of one or more turbomachines;
   a processing module coupled to the database that receives the characteristics from the database and creates the risk analysis, the processing module including:
      a modeling module that creates a representation of an amount of airfoil rocking in a particular turbomachine based on the characteristics; and
      a performance modeler coupled to the modeling module and that, based on the representation of the amount of rocking, creates the risk analysis.

2. The system of claim 1, wherein the modeling module converts the characteristics received from the database to a rocking over time representation.

3. The system of claim 2, wherein the rocking is the rocking of an airfoil.

4. The system of claim 2, wherein the processing module further includes:
   a filtration module that filters the representation created by the modeling module to create a filtered representation.

5. The system of claim 4, wherein the filtration module applies an operating mode filter or a data smoothing filter or both.

6. The system of claim 1, wherein the characteristics include dynamic pressure data received from sensors on the one or more turbomachines.

7. The system of claim 1, wherein the characteristics include an indication of clocking of the airfoils of the one or more turbomachines.

8. A computer implemented method of creating an inspection recommendation for a turbomachine, the method comprising:
   receiving at a computer operational data related to the turbomachine, the operational data including dynamic pressure indications from a region near at least one airfoil;
   creating a failure model from a first risk model based on the dynamic pressure indications; and
   creating an inspection recommendation based on the failure model.

9. The method of claim 8, further comprising:
   creating the risk model.

10. The method of claim 9, wherein creating the risk model includes:
    receiving operational information values from a data base that represents life expectancy of an airfoil based on an amount of rocking.

11. A computer implemented method of creating an inspection recommendation for a turbomachine, the method comprising:
    receiving at a computer operational data related to the turbomachine, the operational data including information related to clocking of airfoils in the turbomachine;
    creating a failure model from a risk model based on the clocking information; and
    creating an inspection recommendation based on the failure model.

12. The method of claim 11, further comprising:
    creating the risk model.

13. The method of claim 12, wherein creating the risk model includes:
    receiving operational information values from a data base that represents life expectancy of an airfoil related to clocking of the airfoils.

14. The method of claim 11, further comprising:
    determining that dynamic pressure readings are not available.

* * * * *